Jan. 29, 1946.　　　G. F. HODSON　　　2,393,633
EGG FILTER
Filed April 24, 1943
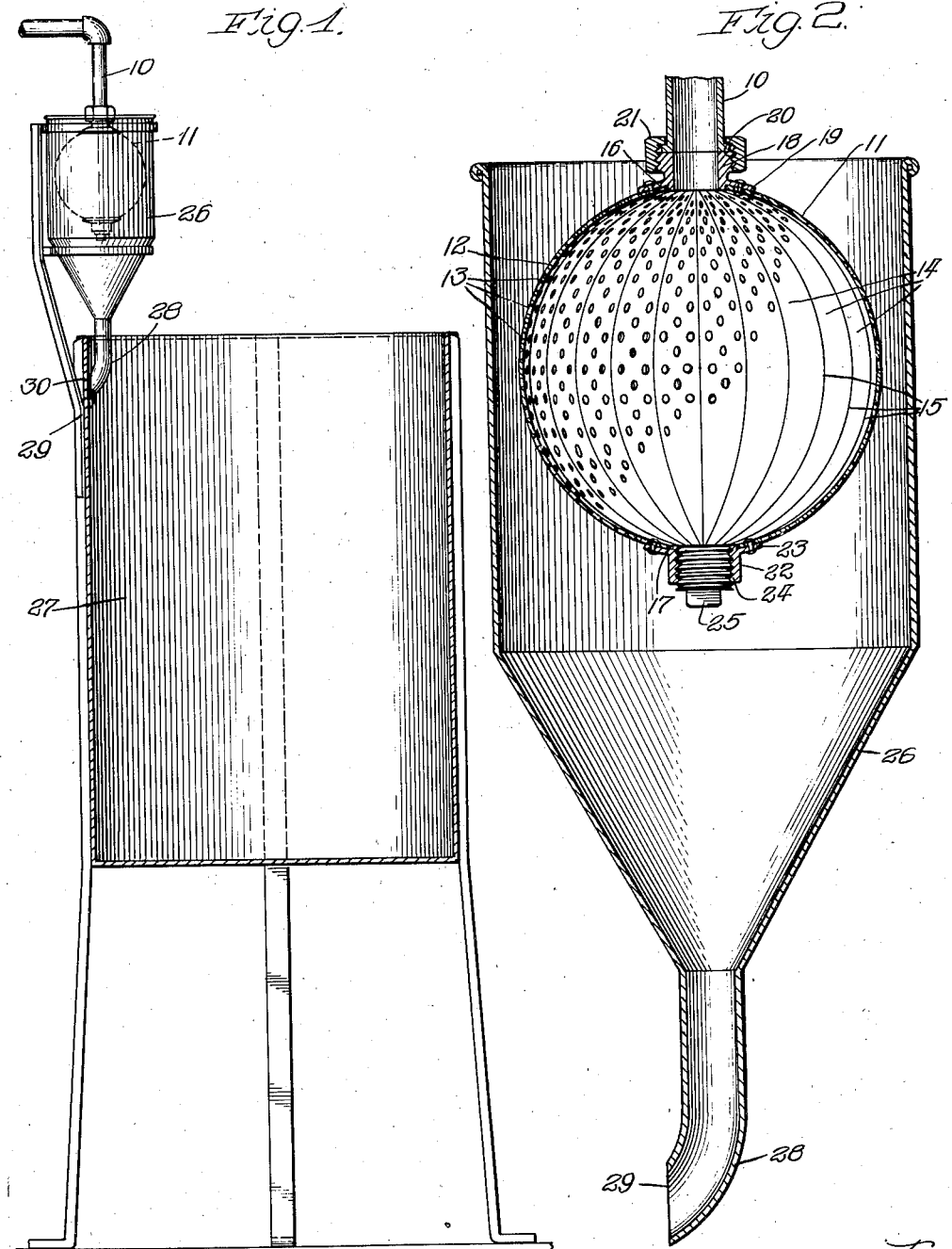

Patented Jan. 29, 1946

2,393,633

UNITED STATES PATENT OFFICE 2,393,633

EGG FILTER

George F. Hodson, Oklahoma City, Okla., assignor to Wilson & Company, Chicago, Ill., a corporation of Delaware Application April 24, 1943, Serial No. 484,396

2 Claims. (Cl. 210—149)

This invention relates to an egg filter of a new type.

It has already been suggested that eggs be filtered, either as yolks, whites, or whole eggs without the shell, through screens formed as hollow elongated cylinders within an enclosing casing. That form of filter has several disadvantages. For example, the condition of the filter cannot be visually inspected without disassembling it. That filter has relatively small capacity relative to the size of the conduit leading to it. The casing must be removed in order to clean the filter and this almost always leads to some spilling of the liquid material within the casing. There is also constant danger in the old form of filter that the joint between the filter and casing, which is made in slip-in form to permit ready disassembly, may leak and permit unfiltered material to pass.

The present invention overcomes all of these difficulties and presents certain other advantages.

The invention is illustrated in the drawing in which Figure 1 is a side elevation, partially in section, of a filter assembly in operative relation to the filtering machinery; and Figure 2 is an enlarged sectional view of the filter, hopper and the conduit leading to the filter.

As shown in the drawing, the filtering system comprises an enclosed conduit 10 for passing egg material to be filtered under pressure to the filter 11. The filter 11 consists of a hollow ball having a sheet metal foraminous wall 12 in which the openings 13 are of the necessary small dimensions, usually about $\frac{1}{16}$ inch. The openings are likewise distributed so as to produce about $33\frac{1}{3}\%$ openings in the metal. The filter is assembled from a plurality of diametrical segments 14 which are welded to each other at abutting edges 15. The ends of the segments are cut away to form an inlet opening 16 and an outlet opening 17. At the inlet opening 16 a male connection 18 is secured to the filter by means of a collar 19 which is riveted and welded to the filter. The neck 20 of the element 18 is threaded and the conduit 10 is held in place by the collar 21. The outlet opening is provided with a female element 22 comprising a collar 23 and a threaded neck 24. The neck is closed by the removable threaded plug 25.

The filter is positioned within the open collector 26 through which the filtered egg material passes to the hopper 27. The outlet 28 of the collector terminates in the upper portion of the hopper and its mouth 29 is directed toward the wall 30 thereof so that egg material passes down the wall without splashing.

In operation egg material is introduced under pressure through the conduit 10 into the filter 11. A preferred internal diameter of the filter is about 12 inches. The collector or funnel 26 is just slightly larger, for example, 16 inches. The egg material passes out through the openings 13 which remove any solid matter and impurities and then drains down the outside of the ball into the collector from which it drains against the wall 30 of the hopper or churn 27. The filtering area of the ball is about 33% more than is obtainable with the cylindrical type filter now in use and, therefore, has a capacity considerably above former filters. Furthermore it has a larger capacity for retained impurities.

When the filter has become clogged, or has all of the filtered material within it which is permissible, it readily becomes ascertainable on visual inspection. The ball may then be disconnected if desired, but in practice the plug 25 is simply removed, a hose injected, and the filter washed in that manner. For this purpose the collector 26 may either be made readily removable, or the filter itself may be lifted from the collector by swinging the conduit 10, or a hose may be inserted within the collector 26 and a bucket held between the outlet 29 while the cleansing operation is being carried out.

What I claim as new, and desire to secure by Letters Patent, is:

1. An egg filter comprising a restricted enclosed egg feeding conduit, a hollow ball of a much greater diameter than the conduit having its interior opening directly connected thereto, said ball having a foraminous wall adapted to serve as an egg filter, and means for collecting filtered egg beneath the ball, said ball being provided with a drain opening and a removable plug therein.

2. An egg filter comprising a ball having a foraminous wall provided with inlet conduit and a clean-out opening, said inlet opening being adapted for connection to a closed conduit, and removable means for closing the clean-out opening.

GEORGE F. HODSON.